United States Patent
De Groot, Jr. et al.

(10) Patent No.: US 9,080,077 B2
(45) Date of Patent: Jul. 14, 2015

(54) METHODS FOR FABRICATING FLEXIBLE WAVEGUIDES USING ALKYL-FUNCTIONAL SILSESQUIOXANE RESINS

(75) Inventors: Jon De Groot, Jr., Midland, MI (US); Shedric Glover, Midland, MI (US); David Witker, Bay City, MI (US)

(73) Assignee: Dow Corning Corporation, Midland, MI (US)

( * ) Notice: Subject to any disclaimer, the term of this patent is extended or adjusted under 35 U.S.C. 154(b) by 462 days.

(21) Appl. No.: 13/517,274

(22) PCT Filed: Nov. 22, 2010

(86) PCT No.: PCT/US2010/057584
§ 371 (c)(1),
(2), (4) Date: Jun. 20, 2012

(87) PCT Pub. No.: WO2011/084250
PCT Pub. Date: Jul. 14, 2011

(65) Prior Publication Data
US 2012/0301094 A1    Nov. 29, 2012

Related U.S. Application Data

(60) Provisional application No. 61/288,589, filed on Dec. 21, 2009.

(51) Int. Cl.
*G02B 6/10* (2006.01)
*C09D 183/06* (2006.01)
(Continued)

(52) U.S. Cl.
CPC .............. *C09D 183/06* (2013.01); *C08G 77/14* (2013.01); *C08G 77/20* (2013.01); *C08G 77/80* (2013.01); *G02B 1/045* (2013.01); *G02B 1/046* (2013.01); *G02B 1/048* (2013.01); *G02B 6/138* (2013.01)

(58) Field of Classification Search
None
See application file for complete search history.

(56) References Cited

U.S. PATENT DOCUMENTS 3,455,877 A    7/1969    Plueddemann et al.
6,187,834 B1    2/2001    Thayer et al.
(Continued)

FOREIGN PATENT DOCUMENTS

EP    0562922    9/1993
EP    1 434 068 A2    6/2004
(Continued)

OTHER PUBLICATIONS

Kai Su et al: "Siloxane Materials for Optical Applications", Proceedings of SPIE, The International Society for Optical Engineering SPIE, USA, vol. 6029, Jan. 23, 2006, pp. 1-8.
(Continued)

*Primary Examiner* — Sarah Hahm
(74) *Attorney, Agent, or Firm* — Nixon Peabody LLP (57) ABSTRACT

A silicone composition comprises (A) an organopolysiloxane resin having the formula $(R^1R^2{}_2SiO_{1/2})_v(R^2{}_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided that the organopolysiloxane resin has an average of at least two silicon-bonded epoxy-substituted organic groups per molecule; (B) an organic solvent; and (C) a photoinitiator. Planar optical waveguide assemblies having one or more layers comprising the silicone composition, and methods for preparing the planar optical waveguide assemblies are provided.

20 Claims, 4 Drawing Sheets (51) Int. Cl.
    *C08G 77/14* (2006.01)
    *C08G 77/20* (2006.01)
    *G02B 1/04* (2006.01)
    *G02B 6/138* (2006.01)
    *C08G 77/00* (2006.01)

(56) References Cited

U.S. PATENT DOCUMENTS

| | | |
|---|---|---|
| 6,537,723 B1 | 3/2003 | Toyoda et al. |
| 6,832,036 B2 | 12/2004 | Ghoshal et al. |
| 6,905,904 B2 | 6/2005 | Gardner et al. |
| 6,907,176 B2 | 6/2005 | Gardner et al. |
| 7,005,231 B2 | 2/2006 | Tamaki et al. |
| 7,072,563 B2 | 7/2006 | Shelnut et al. |
| 7,072,564 B2 | 7/2006 | Shelnut et al. |
| 7,072,565 B2 | 7/2006 | Shelnut et al. |
| 7,157,212 B2 | 1/2007 | Pugliano et al. |
| 7,162,131 B2 | 1/2007 | Takase et al. |
| 7,283,715 B2 | 10/2007 | Kodama et al. |
| 2003/0235383 A1 | 12/2003 | Gardner et al. |
| 2007/0107629 A1 | 5/2007 | Zheng et al. |
| 2007/0202435 A1 | 8/2007 | Shelnut et al. |
| 2008/0032061 A1 | 2/2008 | Watanabe et al. |
| 2008/0058441 A1 | 3/2008 | Watanabe et al. |
| 2009/0052856 A1 | 2/2009 | Bae et al. |

FOREIGN PATENT DOCUMENTS

| | | |
|---|---|---|
| EP | 1 593 703 A1 | 11/2005 |
| WO | WO 2004/090041 A2 | 10/2004 |
| WO | WO 2006/112943 A1 | 10/2006 |

OTHER PUBLICATIONS

International Search Report, International Application No. PCT/US2010/057584, Date of mailing Aug. 8, 2011, 4 pages.
International Written Opinion, International Application No. PCT/US2010/057584, Date of mailing Aug. 8, 2011, 5 pages.

METHODS FOR FABRICATING FLEXIBLE WAVEGUIDES USING ALKYL-FUNCTIONAL SILSESQUIOXANE RESINS

CROSS REFERENCE TO RELATED APPLICATIONS

This application is a U.S. national stage of International Application No. PCT/US2010/057584, filed Nov. 22, 2010, which claims priority to U.S. Provisional Application No. 61/288,589 filed on Dec. 21, 2009, which are incorporated herein in their entirety.

The present invention relates generally to optical waveguides and, more particularly, to optical waveguides comprising one or more layers comprising a cured organopolysiloxane resin.

Planar optical waveguides containing a silicone layers are known in the art. For example, U.S. Pat. Nos. 6,905,904 B2 and 6,907,176 B2 disclose planar optical waveguides containing a silicone core and methods for their preparation. These methods employ a photocurable silicone composition comprising an organopolysiloxane resin having an average of at least two alkenyl groups per molecule, an organosilicon compound having an average of at least two silicon-bonded hydrogen atoms per molecule, and a photoactivated hydrosilylation catalyst.

U.S. Publication No. 2008/0058441 and U.S. Publication No. 2008/0032061 disclose planar optical waveguides containing a silicone core and photopatterning methods for their preparation. The silicone core is formed by curing an epoxy-containing organopolysiloxane resin comprising organic groups selected from monovalent aliphatic hydrocarbon groups having 1 to 6 carbon atoms, monovalent aromatic hydrocarbon groups having 6 to 10 carbon atoms, and epoxy-containing monovalent hydrocarbon groups. The epoxy-containing organopolysiloxanes disclosed in these publications require the presence of $(R^4R^5SiO_{2/2})$ (D-units) and $(R^6SiO_{3/2})$ (T-units).

The '441 publication discloses also that a film-type optical waveguide can be produced by peeling the silicone material off the substrate. The '061 publication acknowledges that the cured product in the '441 publication exhibits insufficient adhesion to the substrate. The '061 publication teaches that adhesion can be improved by including a photosensitizer or photo-radical generator in the silicone composition containing the resin.

Although the above references disclose methods of preparing optical waveguides having a range of physical properties, there remains a continued need for methods of producing planar optical waveguide assemblies having superior flexibility and increased adhesion to polymer substrates.

These needs are met through the various embodiments disclosed herein, wherein methods are described for producing planar optical waveguide assemblies with increased flexibility and improved adhesion to polymer substrates. The planar optical waveguide assemblies contain at least a core layer and, optionally, a cladding comprising an upper cladding layer, a lower cladding layer, or both. One or more of the layers comprise a cured product of an epoxy-functional organopolysiloxane resin comprising silsesquioxane units (T-units) having the formula $R^3SiO_{3/2}$, where $R^3$ is $C_4$ to $C_8$ alkyl. The core layer may be formed using a photopatterning process.

According to some embodiments, a first method for preparing a planar optical waveguide assembly comprises:

(i) applying a silicone composition to a surface of a substrate to form a first silicone film, wherein the silicone composition comprises:
 (A) an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule,
 (B) an organic solvent, and
 (C) a photoinitiator;
(ii) exposing at least one selected region of the first silicone film to radiation having a wavelength of from 150 nm to 800 nm to produce a partially exposed film having at least one exposed region and at least one non-exposed region;
(iii) removing the non-exposed region of the partially exposed film with a developing solvent to form a patterned film; and
(iv) heating the patterned film for an amount of time sufficient to form at least one silicone core having a refractive index of from about 1.45 to about 1.60 at 23° C. for light having a wavelength of 589 nm, such that the refractive index of the silicone core is greater than the refractive index of the substrate.

In some embodiments, the subscript w in the organopolysiloxane resin of the silicone composition is chosen as zero (representing an organopolysiloxane resin lacking D-units).

According to further embodiments, a second method of preparing a planar optical waveguide assembly comprises:

(i) applying a first curable polymer composition to a surface of a substrate to form a first polymer film;
(ii) curing the first polymer film to form a lower clad layer;
(iii) applying a second curable polymer composition to the lower clad layer to form a second polymer film;
(iv) exposing at least one selected region of the second polymer film to radiation having a wavelength of from 150 to 800 nm to produce a partially exposed film having at least one exposed region and at least one non-exposed region;
(v) removing the non-exposed region of the partially exposed film with a developing solvent to form a patterned film; and
(vi) heating the patterned film for an amount of time sufficient to form at least one polymer core having a refractive index of from about 1.45 to about 1.60 at 23° C. for light having a wavelength of 589 nm; wherein the lower clad layer has a refractive index less than the refractive index of the polymer core, In the second method, the first curable polymer composition only, the second curable polymer composition only, or both curable polymer compositions comprise the silicone composition described above.

The first and second methods may comprise additional steps of depositing an additional polymer film and curing the additional polymer film to form an upper clad layer. The additional polymer film may comprise the silicone composition described above. For planar optical waveguide assemblies comprising a core layer, a lower clad layer, and an upper clad layer, the silicone composition described above may be present in the core layer only, in the lower and upper clad layers only, or in all three layers.

The first and second methods also may comprise an additional heating step between the step of exposing the core layer film being patterned and the step of removing the non-exposed region of the core layer film.

Embodiments disclosed herein are directed to a planar optical waveguide assembly prepared by any of the preceding methods.

According to still further embodiments, a planar optical waveguide assembly may comprise a substrate, at least one polymer core disposed over a portion of the substrate and comprising a second cured polymer composition, and a cladding. The cladding may comprise a lower clad layer, an upper clad layer, or both. The lower clad layer, if present, is disposed on the substrate and below the at least one polymer core and comprises a first cured polymer composition. The upper clad layer, if present, is disposed on the polymer core. If both the lower clad layer and the upper clad layer are present, the upper clad layer is disposed on both the polymer core and the lower clad layer. The upper clad layer comprises a third cured polymer composition.

In the planar optical waveguide assembly, the second cured polymer composition only, or the first and third cured polymer compositions only, or all three cured polymer compositions comprise a polymer produced from curing the silicone composition described above.

These and other features, aspects, and advantages of the present invention will become better understood with reference to the following description, appended claims, and accompanying drawings.

Though the specification concludes with claims particularly pointing out and distinctly claiming the invention, it is believed that embodiments disclosed herein will be better understood from the following description taken in conjunction with the accompanying drawings, in which:

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

As used herein, the term "planar optical waveguide assembly" refers to a waveguide assembly containing at least one core having a rectangular cross section. Also, as used herein, the "refractive index" of a substance is defined as the ratio of the velocity of light in a vacuum to the velocity of light in the substance at 23° C., when the light has a wavelength of 589 nm.

A first method for preparing a planar optical waveguide assembly comprises the steps of:
(i) applying a silicone composition to a surface of a substrate to form a first silicone film, wherein the silicone composition comprises:
(A) an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, such that the organopolysiloxane resin has an average of at least two silicon-bonded epoxy-substituted organic groups per molecule,
(B) an organic solvent, and
(C) a photoinitiator;
(ii) exposing at least one selected region of the first silicone film to radiation having a wavelength of from 150 nm to 800 nm to produce a partially exposed film having at least one exposed region and at least one non-exposed region;
(iii) removing the non-exposed region of the partially exposed film with a developing solvent to form a patterned film; and
(iv) heating the patterned film for an amount of time sufficient to form at least one silicone core having a refractive index of from about 1.45 to about 1.60 at 23° C. for light having a wavelength of 589 nm, such that the refractive index of the silicone core is greater than the refractive index of the substrate.

A silicone composition is applied to a surface of a substrate to form a first silicone film. The silicone composition comprises an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided that the organopolysiloxane resin has an average of at least two silicon-bonded epoxy-substituted organic groups per molecule. In further embodiments of the organopolysiloxane resin, $R^1$, $R^2$, and $R^3$ may be defined as above, with v being from 0 to 0.2, w being from 0 to 0.1, x being from 0.4 to 0.9, y being from 0.1 to 0.5, z being from 0 to 0.1, and v+w+x+y+z=1.

In the organopolysiloxane resin, group $R^1$ represents a $C_1$ to $C_{10}$ hydrocarbyl. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl. Examples of deuterium-substituted hydrocarbyl groups include, but are not limited to, the hydrocarbyl groups listed above wherein at least one deuterium atom replaces an equal number of hydrogen atoms. Examples of halogen-substituted hydrocarbyl groups include, but are not limited to, 3,3,3-trifluoropropyl, 3-chloropropyl, dichlorophenyl, dibromophenyl, and 3,3,4,4,5,5,6,6,6-nonafluorohexyl.

In the organopolysiloxane resin, group $R^2$ represents $R^1$ or an epoxy-substituted organic group. Examples of epoxy-substituted organic groups include, but are not limited to, glycidyl, epoxyethyl, epoxypropyl, epoxybutyl, 1,2-epoxycyclohexyl, and epoxydecyl. Further examples of epoxy-substituted organic groups are described in the context of epoxy-substituted alkoxysilanes in U.S. Pat. No. 3,455,877, which is incorporated herein by reference. The organopolysiloxane resin comprises an average of at least two silicon-bonded epoxy-substituted organic groups per molecule.

In the organopolysiloxane resin, group $R^3$ represents $C_4$ to $C_8$ alkyl. Examples of $C_4$ to $C_8$ alkyl groups include, but are not limited to straight-chained alkyl such as butyl, pentyl, hexyl, heptyl, and octyl; and branched alkyl such as 1-methylethyl, 1,1-dimethylethyl, 1-methylpropyl, 2-methylpropyl, 1-methylbutyl, 1-ethylpropyl, 2-methylbutyl, 3-methylbutyl, 1,2-dimethylpropyl, and 2,2-dimethylpropyl. The $C_4$ to $C_8$ alkyl groups represented by $R^3$ may include also $C_4$ to $C_8$ alkyl groups, wherein one or more hydrogen atoms is replaced with an equal number of deuterium atoms or of halogen atoms such as fluorine, chlorine, bromine, or iodine. In some embodiments, $R^3$ may be selected from the group consisting of 2-methylpropyl(isobutyl; —$CH_2$—CH—($CH_3$)$_2$), n-hexyl (—($CH_2$)$_5CH_3$), and n-octyl (—($CH_2$)$_7$$CH_3$).

In the organopolysiloxane resin, the subscript v has a value from 0 to 0.3, alternatively from 0 to 0.2, and represents the fraction of siloxane units in the organopolysiloxane resin that are monofunctional siloxane units (M-units) substituted with three groups independently selected from a $C_1$ to $C_{10}$ hydrocarbyl and an epoxy-substituted organic group, at least one of which is a $C_1$ to $C_{10}$ hydrocarbyl. The subscript w has a value from 0 to 0.5, alternatively from 0 to 0.1, and represents the fraction of siloxane units in the organopolysiloxane resin that are di-functional siloxane units (D-units) with two groups independently selected from a $C_1$ to $C_{10}$ hydrocarbyl and an epoxy-substituted organic group. In some embodiments, the subscript w equals zero. The subscript x has a value from 0 to 0.9, alternatively from 0.4 to 0.9, and represents the fraction of siloxane units in the organopolysiloxane resin that are silsesquioxane units independently substituted with one group selected from $C_1$ to $C_{10}$ hydrocarbyl and an epoxy-substituted organic group. The subscript y has a value from 0.1 to 0.8, alternatively from 0.3 to 0.5, and represents the fraction of siloxane units in the organopolysiloxane resin that are silsesquioxane units independently substituted with a $C_4$ to $C_8$ alkyl group. Thus, the fraction of siloxane units in the organopolysiloxane resin that are tri-functional siloxane units (T-units) may be represented by the sum of x and y. The subscript z has a value from 0 to 0.5, alternatively from 0 to 0.1, and represents the fraction of siloxane units in the organopolysiloxane resin that are tetra-functional siloxane units (Q-units). The sum of the subscripts v+w+x+y+z equals 1.

Methods of preparing organopolysiloxane resins are well known in the art. Organopolysiloxane resins typically are prepared by cohydrolyzing the appropriate mixture of chlorosilane precursors in an organic solvent, such as toluene. For example, a copolymer consisting essentially of $R^1R^2_2SiO_{1/2}$ units (M-units) and $R^3SiO_{3/2}$ units (T-units), can be prepared by cohydrolyzing a compound having the formula $R^1R^2_2SiCl$ and a compound having the formula $R^3SiCl_3$ in toluene, where $R^1$, $R^2$, and $R^3$ are as defined above, to form an MT resin. The aqueous hydrochloric acid and silicone hydrolyzate are separated, and the hydrolyzate is washed with water to remove residual acid and heated in the presence of a mild condensation catalyst to "body" the resin to the requisite viscosity. If desired, the resin can be treated further with a condensation catalyst in an organic solvent to reduce the content of silicon-bonded hydroxy groups. Similarly, MTQ resins, MTD resins, and TD resins can be prepared by cohydrolysis and condensation of $R^1R^2_2SiCl$, $R^3SiCl_3$, and $SiCl_4$; $R^1R^2_2SiCl$, $R^3SiCl_3$, and $R^2_2SiCl_2$; and $R^3SiCl_3$ and $R^2_2SiCl_2$; respectively, where $R^1$, $R^2$, and $R^3$ are as defined above. Alternatively, silanes containing hydrolysable groups other than chloro, such —Br, —I, —$OCH_3$, —$OC(O)CH_3$, —$N(CH_3)_2$, —$NHCOCH_3$, and —$SCH_3$, can be utilized as starting materials in the cohydrolysis reaction. The properties of the resin products depend on the types of silanes, the mole ratio of silanes, the degree of condensation, and the processing conditions.

The silicone composition can further comprise an appropriate quantity of at least one organic solvent to lower the viscosity of the composition and facilitate the preparation, handling, and application of the composition. Examples of suitable solvents include, but are not limited to, saturated hydrocarbons having from 1 to about 20 carbon atoms; aromatic hydrocarbons such as xylenes and mesitylene; mineral spirits; halohydrocarbons; esters; ketones; silicone fluids such as linear, branched, and cyclic polydimethylsiloxanes; and mixtures of such solvents. The optimum concentration of a particular solvent in the present silicone composition can be readily determined by routine experimentation.

The silicone composition may comprise a photoinitiator for accelerating a photopolymerization reaction of the composition. This component can be represented, for example, by a radical photoinitiator, a cationic photoinitiator, or a mixture thereof. The photoinitiator may comprise a combination of two or more photoinitiators. The photoinitiator may further comprise a sensitizer such as, for example, thioxanthones such as 2-chlorothioxanthone, 4-chlorothioxanthone, 2-isopropylthioxanthone, 4-isopropylthioxanthone, 2-methylthioxanthone, 2-decylthioxanthone and 2-dodecylthioxanthone.

Examples of free-radical photoinitiators include, but are not limited to, benzophenone; acetophenones such as dialkoxyacetophenones, dichloroacetophenones, and trichloroacetophenones; benzyl α-hydroxyketones; α-aminoketones; bis-acylphosphine oxide; quinones; O-acylated-α-oximinoketones; or derivatives of any of these.

Examples of cationic photoinitiators include, but are not limited to onium salts, diaryliodonium salts of sulfonic acids, triarylsulfonium salts of sulfonic acids, diaryliodonium salts of boronic acids, and triarylsulfonium salts of boronic acids.

The onium salts may be selected from the group consisting of $Y_2I^+MX_n^-$, $Y_3S^+MX_n^-$, $Y_3Se^+MX_n^-$, $Y_4P^+MX_n^-$, and $Y_4N^+MX_n^-$, wherein each Y is an organic group having from 1 to 30 carbon atoms exemplified by aromatic carbocyclic groups having from 6 to 20 carbon atoms. Each Y can be substituted with from 1 to 4 monovalent hydrocarbon groups exemplified by alkoxy groups having from 1 to 8 carbon atoms, alkyl groups having from 1 to 8 carbon atoms, nitro, chloro, bromo, cyano, carboxyl, mercapto, and aromatic heterocyclic groups exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Y, Pr, and Nd, and metalloids exemplified by B, P, and As. $MX_n^-$ is a non-basic, non-nucleophilic anion exemplified by $BF_4^-$, $PF_6^-$, $AsF_6^-$, $SbF_6^-$, $SbCl_6^-$, $HSO_4^-$, $ClO_4^-$, $FeCl_4^{2-}$, $SnCl_6^-$, and $BiCl_5^{2-}$.

Specific examples of suitable onium salts include, but are not limited to bis-diaryl iodonium salts, for example, bis(dodecyl phenyl) iodonium hexafluoroarsenate, bis(dodecylphenyl) iodonium hexafluoroantimonate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as cationic photoinitiators. Example diaryliodonium salts of sulfonic acid are diaryliodonium salts of perfluoroalkylsulfonic acids and diaryliodonium salts of aryl sulfonic acids. Example diaryliodonium salts of perfluoroalkylsulfonic acids are diaryliodonium salts of perfluorobutanesulfonic acid, diaryliodonium salts of perfluoroethanesulfonic acid, diaryliodonium salts of perfluoro-octanesulfonic acid, and diaryliodonium salts of trifluoromethane sulfonic acid.

Example diaryliodonium salts of aryl sulfonic acids are diaryliodonium salts of p-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Example triarylsulfonium salts of sulfonic acid include triarylsulfonium salts of perfluoroalkylsulfonic acids and triarylsulfonium salts of aryl sulfonic acids. Example triarylsulfonium salts of perfluoroalkylsulfonic acids include triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Example triarylsulfonium salts of aryl sulfonic acids include triarylsulfonium salts of p-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid. Example diaryliodonium salts of boronic acids, and triarylsulfonium salts of boronic acids are compounds such as those disclosed in European Patent Application No. 0562922. Example diaryliodonium salts of boronic acids include diaryliodonium salts of perhaloarylboronic acids, and example triarylsulfonium salts of boronic acids include the triarylsulfonium salts of perhaloarylboronic acid.

Specific examples of suitable cationic photoinitiators include, but are not limited to, bis(dodecyl phenyl) iodonium hexafluoroarsenate, bis(dodecylphenyl) iodonium hexafluoroantimonate, and dialkylphenyl iodonium hexafluoroantimonate.

Although there are no special restrictions with regard to the amount in which the photoinitiator should be used, it is recommended to use this component in the amount from 0.01 wt. % to 20 wt. %, alternatively from 0.1 wt. % to 10 wt. %, alternatively from 0.1 wt. % to 5 wt. %, alternatively from 0.5 wt. % to 1 wt. %. If the photoinitiator is used in an amount below the lower limit of the recommended range, the obtained composition may show a tendency to decrease in photocurability. If the photoinitiator is used in the amount exceeding the upper limit of the recommended range, a cured body obtained from the composition may have low mechanical strength.

The viscosity of the organopolysiloxane resin at 25° C. is typically from 0.001 Pa·s to 100,000 Pa·s, alternatively from 0.01 Pa·s to 10,000 Pa·s, alternatively from 0.01 Pa·s to 10,000 Pa·s. The viscosity of the organopolysiloxane resin varies with molecular weight and structure. Organopolysiloxane resin component (A) can be a single organopolysiloxane resin or a mixture comprising two or more organopolysiloxane resins that differ in at least one of the following properties: structure, viscosity, average molecular weight, siloxane units, and sequence.

The silicone composition can also comprise additional ingredients, provided the additional ingredient does not adversely affect the photopatterning or cure of the composition in the methods described herein. Examples of additional ingredients include, but are not limited to, adhesion promoters, solvents, inorganic fillers, photosensitizers, and surfactants.

The substrate can be a rigid or flexible material. Examples of substrates include, but are not limited to, a semiconductor material such as silicon, silicon having a surface layer of silicon dioxide, and gallium arsenide; quartz; fused quartz; aluminum oxide; polyolefins such as polyethylene and polypropylene; fluorocarbon polymers such as polytetrafluoroethylene and polyvinylfluoride; polystyrene; polyamides such as Nylon; polyimides; polyesters and acrylic polymers such as poly(methyl methacrylate); epoxy resins; polycarbonates; polysulfones; polyether sulfones; ceramics; and glass.

The silicone composition can be applied to the substrate using any conventional method, such as spin coating, dipping, spraying, brushing, or screen printing. The silicone composition is typically applied by spin coating at a speed of from 200 rpm to 5000 rpm for 5 s to 60 s. The spin speed, spin time, and viscosity of the curable polymer composition can be adjusted so that the silicone film produced in step (i) has the desired thickness.

At least one selected region of the silicone film is exposed to radiation having a wavelength of from about 150 nm to about 800 nm, alternatively from about 250 nm to about 450 nm, to produce a partially exposed film having at least one exposed region and at least one non-exposed region. The light source typically used is a medium-pressure mercury-arc lamp. The dose of radiation is typically from about 0.1 mJ/cm$^2$ to about 5,000 mJ/cm$^2$, alternatively from about 250 mJ/cm$^2$ to about 1,300 mJ/cm$^2$. The selected region of the silicone film is exposed to radiation through a photomask having a pattern of images.

The non-exposed region of the partially exposed film may be removed with a developing solvent to form a patterned film. The developing solvent may comprise an organic solvent in which the non-exposed region of the partially exposed film is at least partially soluble and the exposed region is substantially insoluble. Depending on the specific silicone composition used to form the silicone core, the exposed region may be readily substantially insoluble in the developing solvent or may require an additional heating step, described below, to be rendered substantially insoluble in the developing solvent. The developing solvent typically has from 3 to 20 carbon atoms per molecule. Examples of developing solvents include ketones, such as methyl isobutyl ketone and methyl pentyl ketone; ethers, such as n-butyl ether and polyethylene glycol monomethylether; esters, such as ethyl acetate and γ-butyrolactone; aliphatic hydrocarbons, such as nonane, decalin, and dodecane; and aromatic hydrocarbons, such as mesitylene, xylene, and toluene. The developing solvent can be applied by any conventional method, including spraying, immersion, and pooling. For example, the developing solvent can be applied by forming a pool of the solvent on a stationary substrate and then spin-drying the substrate. The developing solvent is typically used at a temperature of from room temperature to 100° C. The specific temperature of use depends on the chemical properties of the solvent, the boiling point of the solvent, the desired rate of pattern formation, and the requisite resolution of the photopatterning process.

The patterned film then is heated for an amount of time sufficient to form at least one silicone core having a refractive index of from about 1.45 to about 1.60, alternatively from about 1.30 to about 1.70, alternatively from about 1.45 to about 1.55, at 23° C. for light having a wavelength of 589 nm, provided the refractive index of the at least one silicone core is greater than the refractive index of the substrate. The patterned film typically is heated for an amount of time sufficient to achieve maximum crosslink density in the silicone without oxidation or decomposition. The patterned film is typically heated at a temperature of from about 50° C. to about 300° C. for about 1 min to about 300 min, alternatively from about 75° C. to about 275° C. for about 10 min to about 120 min, alternatively from about 200° C. to about 250° C. for about 20 min to about 60 min. The patterned film can be heated using conventional equipment such as a hot plate or oven. The silicone core typically has a thickness (height) of from about 1 µm to about 100 µm, alternatively from about 5 µm to about 50 µm, alternatively from about 8 µm to about 20 µm.

Figure 1:
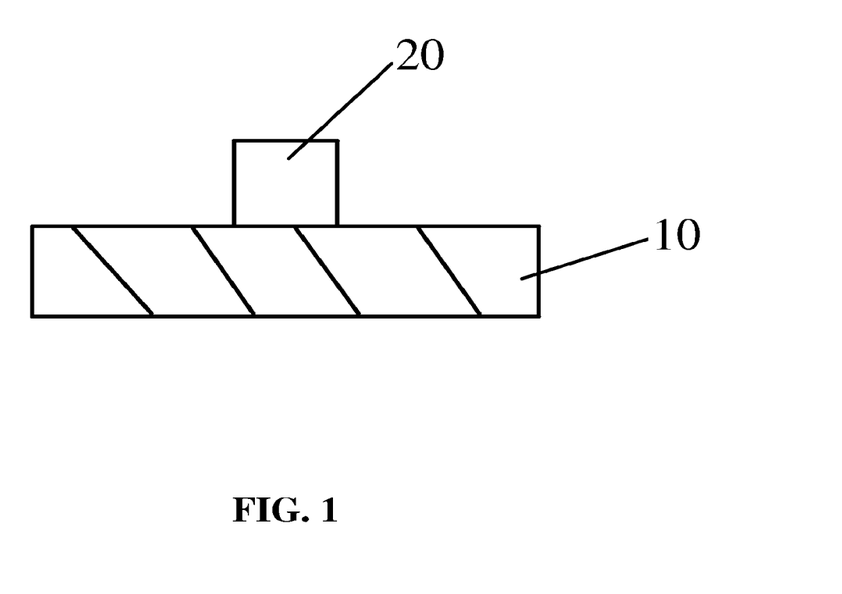
FIG. 1 shows a cross-sectional view of a first embodiment of a planar optical waveguide assembly prepared according to methods described herein.

An embodiment of a planar optical waveguide assembly prepared by the first method is shown in FIG. 1. The optical waveguide assembly comprises a substrate 10 and a silicone core 20 comprising the silicone composition as described above and covering a portion of the substrate 10. The silicone core 20 has a refractive index of from about 1.45 to about 1.60 at 23° C. for light having a wavelength of 589 nm, and the silicone core 20 has a refractive index greater than the refractive index of the substrate 10.

The first method for preparing a planar optical waveguide assembly can comprise the further steps of:

(v) covering the substrate and the silicone core with a curable polymer composition to form a polymer film; and (vi) curing the polymer film to form a clad layer, wherein the clad layer has a refractive index less than the refractive index of the silicone core.

The curable polymer composition can be any polymer composition that cures in step (vi) to form a clad layer having a refractive index less than the refractive index of the silicone core. The cure mechanism of the polymer composition is not limited. The polymer composition can be cured, for example, by a condensation or addition reaction. Examples of curable polymer compositions include, but are not limited to, curable silicone compositions, such as hydrosilylation-curable silicone compositions, condensation-curable silicone compositions, and peroxide-curable silicone compositions; curable polyolefin compositions such as polyethylene and polypropylene compositions; curable polyamide compositions; curable epoxy-resin compositions; curable amino-resin compositions; curable polyurethane compositions; curable polyimide compositions; curable polyester compositions; and curable acrylic-resin compositions.

The curable polymer composition can be applied to the substrate using any conventional method, such as spin coating, dipping, spraying, brushing, or screen printing. The silicone composition is typically applied by spin coating at a speed of from 200 rpm to 5000 rpm for 5 s to 60 s. The spin speed, spin time, and viscosity of the curable polymer composition can be adjusted so that the polymer film produced in step (v) has the desired thickness.

In one embodiment, the curable polymer composition may be the silicone composition of step (i), described above. In such an embodiment, at least one of $R^1$, $R^2$, $R^3$, v, w, x, y, and z may be chosen such that the organopolysiloxane resin cured to form the silicone core in step (i) has a chemical structure different from the chemical structure of the organopolysiloxane resin cured to form the clad layer in step (vi).

The curable polymer composition can be applied to cover the silicone core and the substrate using any conventional method, such as spin coating, dipping, spraying, brushing, or screen printing. The curable polymer composition typically is applied by spin coating at a speed of from 200 rpm to 5000 rpm for 5 s to 60 s. The spin speed, spin time, and viscosity of the curable polymer composition can be adjusted so that the upper clad layer produced in step (vi) has the desired thickness.

The polymer film can be cured by a variety of means, depending on the cure mechanism of the second curable polymer composition, including exposure to ambient or elevated temperature, irradiation, and exposure to moisture.

The upper clad layer has a refractive index less than the refractive index of the silicone core. The magnitude of the difference in refractive index between the silicone core and the upper clad layer depends on several factors, including the thickness of the core, wavelength of propagated light, and mode of wave propagation (i.e., single mode or multimode). The difference in refractive index between the silicone core and the upper clad layer is typically from 0.0005 to 0.5, alternatively from 0.001 to 0.05, alternatively form 0.005 to 0.02. For example, a waveguide containing a silicone core having a thickness of 12 µm and a refractive index of 1.5, wherein the waveguide is capable of supporting the first four modes of propagation at a wavelength of 590 nm, has a difference in refractive index between the silicone core and the substrate of about 0.01. A waveguide containing a silicone core having a thickness of 7 µm and a refractive index of 1.5, wherein the waveguide is capable of supporting only single mode propagation at a wavelength of 590 nm, has a difference in refractive index between the silicone core and the upper clad layer of about 0.05. The upper clad layer typically has a thickness of from 5 µm to 200 µm, alternatively from 15 µm to 50 µm, alternatively from 20 µm to 35 µm.

Figure 2:
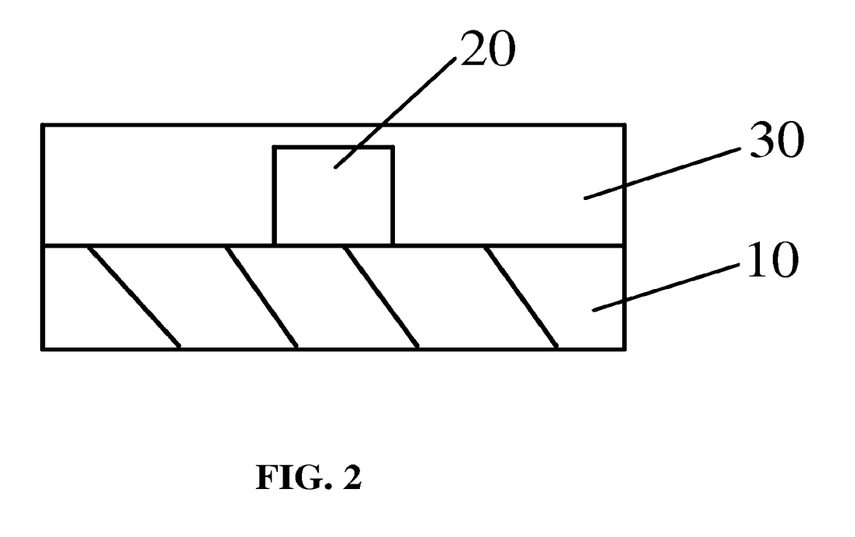
FIG. 2 shows a cross-sectional view of a second embodiment of a planar optical waveguide assembly prepared according to methods described herein.

An embodiment of a planar optical waveguide assembly prepared by the first method, including steps (v) and (vi), is shown in FIG. 2. The optical waveguide assembly comprises a substrate 10, a silicone core 20 comprising the silicone composition as described above and covering a portion of the substrate 10, and an upper clad layer 30 covering the silicone core 20 and a portion of the substrate 10 not covered by the silicone core 20. The silicone core 20 has a refractive index of from about 1.45 to about 1.60 at 23° C. for light having a wavelength of 589 nm, and the upper clad layer 30 has a refractive index less than the refractive index of the silicone core 20.

In further embodiments, the first method of preparing a planar optical waveguide assembly, with or without an upper clad layer, may comprise an additional step between step (ii) and step (iii). In the additional step, the partially exposed film produced in step (ii) is heated. The heating may be conducted for an amount of time sufficient to render the region exposed to radiation ("exposed region") substantially insoluble in the developing solvent to be used in step (iii). But even after the additional heating step, the region of the partially exposed film that was not exposed to radiation in step (ii) ("non-exposed region") will be soluble in the developing solvent to be used in step (iii). The term "substantially insoluble" means that the exposed region of the silicone film is not removed by dissolution in the developing solvent to the extent that the underlying surface of the substrate is exposed. The term "soluble" means that the unexposed region of the silicone film is removed by dissolution in the developing solvent, exposing the underlying surface of the substrate. The partially exposed film is typically heated at a temperature of from about 50° C. to about 250° C. for about 0.1 min to about 10 min, alternatively from about 100° C. to about 200° C. for about 1 min to about 5 min, alternatively from about 135° C. to about 165° C. for about 2 min to about 4 min. The partially exposed film can be heated using conventional equipment such as a hot plate or an oven. In example embodiments, planar optical waveguides such as those of the embodiments depicted in FIGS. 1 and 2 may be prepared by the first method including this additional heating step.

A second method for preparing a planar optical waveguide assembly comprises:

(i) applying a first curable polymer composition to a surface of a substrate to form a first polymer film;

(ii) curing the first polymer film to form a lower clad layer;

(iii) applying a second curable polymer composition to the lower clad layer to form a second polymer film;

(iv) exposing at least one selected region of the second polymer film to radiation having a wavelength of from 150 to 800 nm to produce a partially exposed film having at least one exposed region and at least one non-exposed region;

(v) removing the non-exposed region of the partially exposed film with a developing solvent to form a patterned film; and (vi) heating the patterned film for an amount of time sufficient to form at least one polymer core having a refractive index of from about 1.45 to about 1.60 at 23° C. for light having a wavelength of 589 nm; wherein the lower clad layer has a refractive index less than the refractive index of the polymer core, The first curable polymer composition only, the second curable polymer composition only, or both curable polymer compositions comprise a silicone composition comprising:

(A) an organopolysiloxane resin having the formula $(R^1R^2{}_2SiO_{1/2})_v(R^2{}_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule, (B) an organic solvent, and (C) a photoinitiator.

The substrate can be a rigid or flexible material. Examples of substrates include, but are not limited to, a semiconductor material such as silicon, silicon having a surface layer of silicon dioxide, and gallium arsenide; quartz; fused quartz; aluminum oxide; polyolefins such as polyethylene and polypropylene; fluorocarbon polymers such as polytetrafluoroethylene and polyvinylfluoride; polystyrene; polyamides such as Nylon; polyimides; polyesters and acrylic polymers such as poly(methyl methacrylate); epoxy resins; polycarbonates; polysulfones; polyether sulfones; ceramics; and glass.

The first and second curable polymer compositions, independent from each other, can be any polymer composition that cures in step (ii) to form a lower clad layer or in step (vi) to form a polymer core, provided the lower clad layer has a refractive index less than the refractive index of the polymer core. The cure mechanism of the polymer compositions is not limited. The polymer compositions can be cured, for example, by a condensation or addition reaction. Examples of curable polymer compositions include, but are not limited to, curable silicone compositions, such as hydrosilylation-curable silicone compositions, condensation-curable silicone compositions, and peroxide-curable silicone compositions; curable polyolefin compositions such as polyethylene and polypropylene compositions; curable polyamide compositions; curable epoxy-resin compositions; curable amino-resin compositions; curable polyurethane compositions; curable polyimide compositions; curable polyester compositions; and curable acrylic-resin compositions.

At least one of the first and second curable polymer compositions comprises the silicone composition described in step (i) of the first method of forming a planar optical waveguide assembly—namely, a silicone composition comprising (A) an organopolysiloxane resin having the formula $(R^1R^2{}_2SiO_{1/2})_v(R^2{}_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule; (B) an organic solvent; and (C) a photoinitiator. In one embodiment, only the first curable polymer composition comprises the silicone composition. In another embodiment, only the second curable polymer composition comprises the silicone composition. In yet another embodiment, both the first curable polymer composition and the second curable polymer composition comprise the silicone composition. In such an embodiment, at least one of $R^1$, $R^2$, $R^3$, v, w, x, y, and z may be chosen such that the organopolysiloxane resin cured to form the lower clad layer in step (ii) has a chemical structure different from the chemical structure of the organopolysiloxane resin cured to form the polymer core in step (vi). In some embodiments, the subscript w of the organopolysiloxane resin equals zero. In some embodiments, $R^3$ may be selected from the group consisting of 2-methylpropyl(isobutyl; $-CH_2-CH-(CH_3)_2$), n-hexyl ($-(CH_2)_5CH_3$), and n-octyl ($-(CH_2)_7CH_3$).

The first curable polymer composition can be applied to the substrate using any conventional method, such as spin coating, dipping, spraying, brushing, or screen printing. The first curable polymer composition typically is applied by spin coating at a speed of from about 200 rpm to about 5000 rpm for about 5 s to about 60 s. The spin speed, spin time, and viscosity of the first curable polymer composition can be adjusted so that the lower clad layer has the desired thickness. When the first curable polymer composition comprises a solvent, the method can further comprise removing at least a portion of the solvent from the first polymer film. The solvent can be removed by heating the first polymer film at a temperature of from 50° C. to 150° C. for 1 min to 5 min, alternatively from 80° C. to 120° C. for 2 min to 4 min.

The first polymer film is cured in step (ii) to form a lower clad layer. The first polymer film can be cured by a variety of means, depending on the cure mechanism of the curable polymer composition, including exposure to ambient or elevated temperature, irradiation, and exposure to moisture. The lower clad layer typically has a thickness of from about 5 μm to about 200 μm, alternatively from about 15 μm to about 50 μm, alternatively from about 20 μm to about 35 μm.

The second curable polymer composition can be applied to the lower clad layer in step (iii) using any conventional method, such as spin coating, dipping, spraying, brushing, or screen printing. Typically, the second curable polymer composition is applied by spin coating at a speed of from 200 rpm to 5,000 rpm for 5 s to 60 s. The spin speed, spin time, and viscosity of the second curable polymer composition can be adjusted so that the polymer core produced in step (vi) has the desired thickness. The polymer core typically has a thickness (height) of from about 1 μm to about 100 μm, alternatively from about 5 μm to about 50 μm, alternatively from about 8 μm to about 20 μm.

When the second polymer composition comprises a solvent, the method can further comprise removing at least a portion of the solvent from the second polymer film. The solvent can be removed by heating the second polymer film at a temperature of from about 50° C. to about 150° C. for about 1 min to about 5 min, alternatively from about 80° C. to about 120° C. for about 2 min to about 4 min.

Steps (iv), (v), and (vi) in the second method of preparing a planar optical waveguide assembly are identical to steps (ii), (iii), and (iv) in the first method of preparing a planar optical waveguide described above, respectively.

The polymer core has a refractive index greater than the refractive index of the lower clad layer. The magnitude of the difference in refractive index between the polymer core and the lower clad layer is as described above for the difference in refractive indices between the silicone core and the upper clad layer in planar optical waveguide assemblies produced according to the first method.

Figure 3:
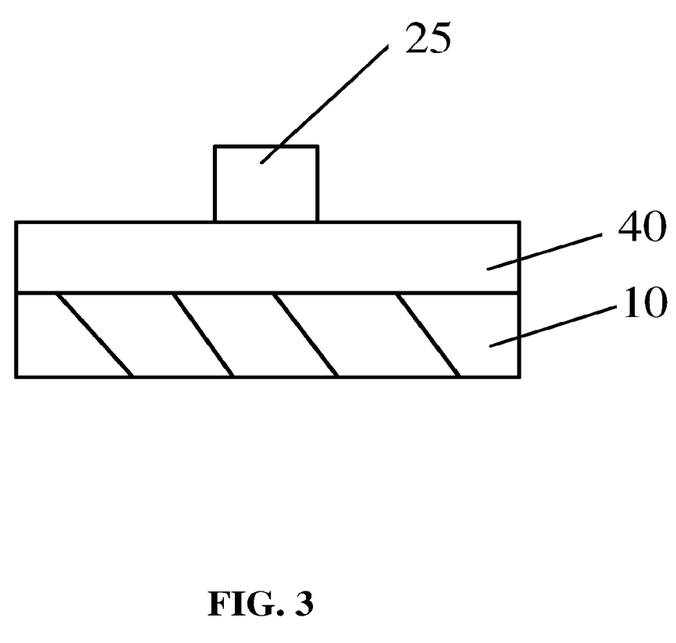
FIG. 3 shows a cross-sectional view of a third embodiment of a planar optical waveguide assembly prepared according to methods described herein.

An embodiment of a planar optical waveguide assembly prepared by the second method is shown in FIG. 3. The optical waveguide assembly comprises a substrate 10, a lower clad layer 40 comprising a first cured polymer composition covering a surface of the substrate 10 and a polymer core 25 comprising a second cured polymer composition and covering a portion of the lower clad layer 40. At least one of the lower clad layer 40 and the polymer core 25 is derived from a curable polymer composition comprising the silicone composition described above. The polymer core 25 has a refractive index of from about 1.45 to about 1.60 at 23° C. for light having a wavelength of 589 nm, and the lower clad layer 40 has a refractive index less than the refractive index of the polymer core 25.

In some embodiments, the second method for preparing a planar optical waveguide assembly can comprise the further steps of:
  (vii) covering the lower clad layer and the polymer core with a third curable polymer composition to form a third polymer film; and
  (viii) curing the third polymer film to form an upper clad layer, wherein the upper clad layer has a refractive index less than the refractive index of the polymer core.

Steps (vii) and (viii) of the second method of preparing a planar optical waveguide assembly are identical to steps (v) and (vi), respectively, as described above for the first method of preparing a planar optical waveguide assembly.

In some embodiments, the third curable polymer composition may comprise the silicone composition described in step (i) of the first method of forming a planar optical waveguide assembly—namely, a silicone composition comprising (A) an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule; and (B) an organic solvent.

In planar optical waveguide assemblies comprising a lower clad layer, a polymer core, and an upper clad layer, preferably if the lower clad layer is derived from the silicone composition, the upper clad layer also is derived from the silicone composition. When both the first curable polymer composition and the third curable polymer composition comprise the silicone composition, groups $R^1$, $R^2$, and $R^3$, and subscripts v, w, x, y, and z may be the same or different in the first and third curable polymer compositions. In one embodiment, the first curable polymer composition and the third curable polymer composition both comprise the silicone composition, but the second curable composition does not comprise the silicone composition. In another embodiment, only the second polymer composition (cured to form the polymer core) comprises the silicone composition.

In yet another embodiment, all three curable polymer compositions comprise the silicone composition. In the organopolysiloxane resins making up the silicone composition, at least one of $R^1$, $R^2$, $R^3$, v, w, x, y, and z may be chosen such that the second curable polymer composition has a chemical structure different from the chemical structures of both the first curable polymer composition and the third curable polymer composition. Groups $R^1$, $R^2$, and $R^3$, and subscripts v, w, x, y, and z may be the same or different in the first and third curable polymer compositions, provided both the lower clad layer and the upper clad layer both have indices of refraction less than the index of refraction of the polymer core. The organopolysiloxane resin of any or all of the first, second, and third curable polymer compositions further may comprise a photoinitiator, as described above. In some embodiments, the subscript w equals zero in the organopolysiloxane resin of any or all of the first, second, and third curable polymer compositions. In some embodiments, $R^3$ may be selected from the group consisting of 2-methylpropyl(isobutyl; —$CH_2$—$CH$—$(CH_3)_2$), n-hexyl (—$(CH_2)_5CH_3$), and n-octyl (—$(CH_2)_7CH_3$) in the organopolysiloxane resin of any or all of the first, second, and third curable polymer compositions.

Figure 4:
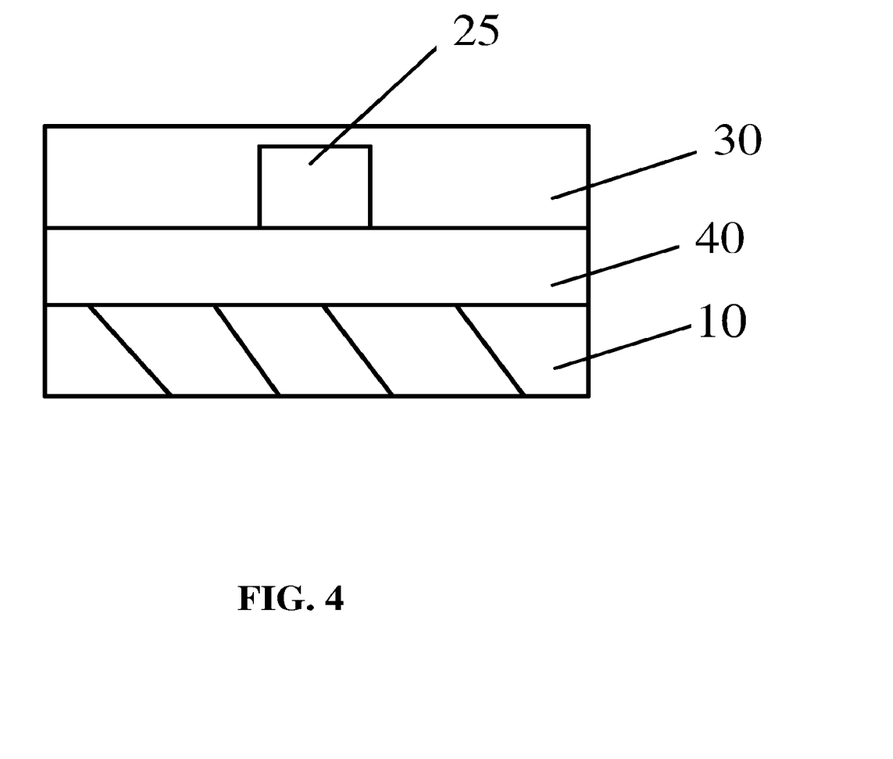
FIG. 4 shows a cross-sectional view of a fourth embodiment of a planar optical waveguide assembly prepared according to methods described herein.

An embodiment of a planar optical waveguide assembly prepared by the second method, including steps (vii) and (viii), is shown in FIG. 4. The optical waveguide assembly comprises a substrate 10, a lower clad layer 40 comprising a first cured polymer composition and covering a surface of the substrate 10, a polymer core 20 comprising a second cured polymer composition and covering a portion of the lower clad layer 40, and an upper clad layer 30 comprising a third cured polymer composition and covering the polymer core 20 and a portion of the lower clad layer 40 not covered by the polymer core 20. The polymer core 25 has a refractive index of from about 1.45 to about 1.60 at 23° C. for light having a wavelength of 589 nm. The lower clad layer 40 and the upper clad layer 30 each have a refractive index less than the refractive index of the polymer core 25. The second cured polymer composition (polymer core 25) only, the first and third polymer compositions (lower cladding layer 40 and upper cladding layer 30, respectively) only, or all three polymer compositions (polymer core 25 and both cladding layers 30, 40) may comprise the silicone composition described above.

As with the first method of preparing a planar optical waveguide assembly, the second method of preparing a planar optical waveguide assembly, with or without an upper clad layer, may comprise an additional step between step (iv) and step (v). In the additional step, the partially exposed film produced in step (iv) is heated. The heating may be conducted for an amount of time sufficient to render the region exposed to radiation ("exposed region") substantially insoluble in the developing solvent to be used in step (v). But even after the additional heating step, the region that was not exposed to radiation in step (iv) ("non-exposed region") will be soluble in the developing solvent. The partially exposed film is typically heated at a temperature of from about 50° C. to about 250° C. for about 0.1 min to about 10 min, alternatively from about 100° C. to about 200° C. for about 1 min to about 5 min, alternatively from about 135° C. to about 165° C. for about 2 min to about 4 min. The partially exposed film can be heated using conventional equipment such as a hot plate or an oven. In example embodiments, planar optical waveguides such as those of the embodiments depicted in FIGS. 3 and 4 may be prepared by the second method including this additional heating step.

A planar optical waveguide assembly may comprise a substrate having a first refractive index at 23° C. for light having a wavelength of 589 nm and at least one polymer core disposed over a portion of the substrate and comprising a second cured polymer composition, the at least one polymer core having a second refractive index from about 1.45 to about 1.60 at 23° C. for light having a wavelength of 589 nm, provided the second refractive index is greater than the first refractive index.

The planar optical waveguide assembly may comprise further a cladding. The cladding may comprise a lower clad layer, an upper clad layer, or both. The lower clad layer, if present, is disposed on the substrate and below the at least one polymer core and comprises a first cured polymer composition. Also, the lower clad layer has a third refractive index at 23° C. for light having a wavelength of 589 nm, the third refractive index being less than the second refractive index. The upper clad layer, if present, is disposed on the polymer core. If both the lower clad layer and the upper clad layer are present, the upper clad layer is disposed on both the polymer core and the lower clad layer. The upper clad layer comprises a third cured polymer composition, and the upper clad layer has a fourth refractive index at 23° C. for light having a wavelength of 589 nm. The fourth refractive index is less than the second refractive index.

In the planar optical waveguide assembly, the second cured polymer composition only, or the first and third cured polymer compositions only, or all three cured polymer compositions comprise a polymer produced from curing the silicone composition described in detail above. In particular, the silicone composition comprises an organopolysiloxane resin having the formula $(R^1R^2{}_2SiO_{1/2})_v(R^2{}_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule. In some embodiments, the subscript w equals zero for the organopolysiloxane resin of the silicone composition. In some embodiments, $R^3$ may be selected from the group consisting of 2-methylpropyl(isobutyl; —$CH_2$—CH—$(CH_3)_2$), n-hexyl (—$(CH_2)_5CH_3$), and n-octyl (—$(CH_2)_7CH_3$) for the organopolysiloxane resin of the silicone composition.

The methods described herein are scaleable to high-throughput manufacturing processes. The methods allow simultaneous fabrication of multiple waveguides on a single substrate. Additionally, the methods employ conventional wafer fabrication techniques (e.g., coating, exposing, developing, curing) and equipment. Furthermore, the methods use photopatternable polymer and silicone compositions, thereby eliminating additional process steps (e.g., applying a photoresist and etching) associated with use of a non-photopatternable polymer composition. Finally, the methods have high resolution, meaning that the methods transfer images from a photomask to the silicone film on a substrate with good retention of critical dimensions.

The planar optical waveguide assemblies made according to methods described herein exhibit superior flexibility, superior resistance to cracking, and superior adhesion to polymer substrates compared to waveguides comprising other known materials. Without intent to be bound by any particular theory, it is believed that the combination in the organopolysiloxane resin of the silicone composition of epoxy-functional units and silsesquioxane units $R^3SiO_{3/2}$, where $R^3$ is $C_4$ to $C_8$ alkyl, substantially influences the improved properties of the planar optical waveguides described herein. In one specific example, films of resins described above routinely survived bending tests without evidence of cracking or delamination, wherein a film was bent more than 10,000 times at a bending radius of about 6 mm. In comparison, similar films comprising resins lacking a $C_4$ to $C_8$ alkyl silsesquioxane functionality were found to crack and peel from the substrate after a single bend with a much larger bend radius. The planar optical waveguide assemblies further exhibit good thermal stability over a wide range of temperatures and good environmental resistance, particularly moisture resistance, comparable to or better than waveguide assemblies using other known materials. Also, the waveguide assemblies exhibit low birefringence and low transmission loss, both equal to or better than the corresponding characteristics of waveguides using other known materials. Thus, superior flexibility and resistance to cracking are not acquired at the expense of transmission loss.

The optical waveguide assemblies according to the embodiments disclosed herein can be used to fabricate components of optical integrated circuits, such as attenuators, switches, splitters, routers, filters, and gratings.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments disclosed herein. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

The present invention will be better understood by reference to the following examples, which are offered by way of illustration and which one of skill in the art will recognize are not meant to be limiting.

EXAMPLE 1

Base Resin Synthesis

As illustrative examples, three types of base resins were synthesized by an acid-catalyzed condensation reaction before being deposited as films: n-octyl, n-hexyl, and 2-methylpropyl(isobutyl). A comparative sample with a methyl-functional resin (i.e., a sample lacking a $C_4$-$C_8$ alkyl substituent) also was prepared. Syntheses of the base resins were carried out in a manner analogous to the following synthesis of an n-octyl resin.

Phenyltrimethoxysilane (206.1 g, 1.04 mol), n-octyltrimethoxysilane (243.1 g, 1.04 mol), divinyltetramethyldisiloxane (129.2 g, 0.69 mol), water (169 g, 9.39 mol), methanol (500 g), and toluene (700 g) were combined in a three-neck flask fitted with a condenser, a Dean-Stark trap, a magnetic stirrer, and a thermometer. A few drops of triflic acid were then added to achieve a pH of 2. The mixture was then stirred at reflux (67° C.) for two hours. After this time, methanol and water were removed by azeotropic distillation. The resulting solution was then stirred at reflux (111° C.) for an additional two hours. The solution was then cooled to room temperature and calcium carbonate was added to neutralize the acid. The mixture was stirred at room temperature for eighteen hours. Then, activated charcoal was added and the mixture was stirred for an additional eighteen hours. The mixture was then filtered using a 0.45-μm PTFE-coated filter. Three small samples were removed and dried for twenty-four hours in an oven at 150° C. to determine the solution's concentration. $^{29}$Si NMR showed resonances characteristic of $M^{Me_2Vi}$ (0 to −4 ppm), $T^{Oct}$ (−60 ppm to −70 ppm), and $T^{Ph}$ (−80 ppm). GPC data showed a bimodal molecular weight distribution. $M_n$=1740 Da, $M_w$=2910 Da, $M_z$=4800 Da, with a polydispersity of 1.67.

EXAMPLE 2

Epoxy-Functional Resin Synthesis

Epoxy-functional resins were prepared by a base-catalyzed re-equilibration to introduce epoxy groups into the resins prepared according to Example 1. For each resin type, the synthetic method was analogous to the following preparation of an epoxy-functional n-octyl resin.

The base n-octyl resin of Example 1 (343.1 g of a 58% solution, 1.5 mol based on average monomer molecular weight of 132.6 for $(T^{Ph})_{0.375}(T^{Oct})_{0.375}(M^{Me_2Vi})_{0.25}$), (3,4-epoxycyclohexyl)ethyltrimethoxysilane (246.1 g, 1.0 mol), water (81 g, 4.5 mol), methanol (760 mL), and toluene (760 mL) were combined in a three-neck flask fitted with a condenser, a Dean-Stark trap, a magnetic stirrer, and a thermometer. A few milliliters of a sodium methoxide solution (25% in methanol) were then added to achieve a pH of 10. The mixture was then stirred at reflux (67° C.) for two hours. After this time, methanol and water were removed by azeotropic distillation. The resulting solution was then stirred at reflux (111° C.) for an additional two hours. The solution was then cooled to room temperature and an aluminosilicate ($Al_2O_3$-$9SiO_2$-$xH_2O$) was added to neutralize the base. The mixture was stirred at room temperature for eighteen hours. Then, activated charcoal was added and the mixture was stirred for an additional eighteen hours. The mixture was then filtered using a 0.45 μm PTFE-coated filter. Three small samples were removed and dried for twenty-four hours in an oven at 150° C. to determine the solution's concentration. $^{29}$Si NMR showed resonances characteristic of $M^{Me_2Vi}$ (0 to −4 ppm), $T^{Oct}$ and $T^{Ep}$ (−60 ppm to −70 ppm), and $T^{Ph}$ (−75 ppm to −80 ppm). GPC data showed a bimodal molecular weight distribution. $M_n$=1540 Da, $M_w$=2020 Da, $M_z$=2840 Da, with a polydispersity of 1.31. All of the epoxy-functional resins disclosed here were synthesized using an analogous procedure.

EXAMPLE 3

Patterning Films

Resins synthesized according to at least one of the foregoing examples were cast as films by spin coating the resins onto silicon wafer substrates covered with Kapton® sheets (polyimide, available from DuPont). A silicon wafer was first cleaned by rinsing with toluene and then isopropanol while spinning at 1000 rpm. Then a layer of Sylgard 184 (silicone elastomer available from Dow Corning; 50% solution in toluene) was applied to the wafer by spinning at 1000 rpm with an acceleration of 500 rpm/s for thirty seconds. After being spun, the substrate was baked on a hot plate at 110° C. for two minutes, and the Kapton® sheet was carefully applied. When bubble formation had been minimized, the substrate was baked for an additional two minutes at 110° C.

The resulting structure was again cleaned with rinses of toluene and isopropanol applied during spinning at 1000 rpm. Then, the resin solution was applied by spinning at 1000 rpm, 500 rpm/s for thirty seconds, and the film was baked on a hot plate for two minutes at 110° C. Thereupon, the resin was cured by exposure to UV radiation from a mercury arc lamp at 1000 mJ/cm². Finally, the coated substrate was baked in an oven at 130° C. for sixty minutes.

Multi-layer and patterned films were fabricated using a similar process to that described for single-layer films. The first layer was prepared as described above, but without the final bake at 130° C. The second layer was applied using the same procedure. In the case of patterned films, in which a layer of patterned core was applied to an initial layer of clad, the curing step was performed using a shadow mask. After exposure, a puddle of development solvent (mesitylene for n-octyl-functional resins and a 3:1 mixture of mesitylene to toluene for n-hexyl and isobutyl resins) was placed on the substrate for two minutes. Thereafter, the substrate was spun at 1000 rpm and additional rinses of development solvent and isopropanol were performed. The patterned film then was baked at 110° C. on a hot plate for two minutes to remove residual solvent. If desired, a third layer, typically of clad, could be applied to the substrate using the same procedure as described for the initial layer.

EXAMPLE 4

Adhesion to Kapton®

Films comprising the resins described in the above examples were tested to determine adherence to thermoplastic substrates. Films of the epoxy-functional resins prepared according to Examples 1 and 2 were applied to a Kapton® substrate after first cleaning the substrate with rinses of toluene and isopropanol while spinning at 1000 rpm. The resin solutions were applied by spinning at 1000 rpm, 500 rpm/s for thirty seconds. Then, the films were baked on a hot plate for two minutes at 110° C. The baked resins were cured by exposure to UV radiation from a mercury arc lamp at 1000 mJ/cm². Finally, the coated substrates were baked in an oven at 130° C. for sixty minutes.

To test adhesion to the substrate, the films were removed from the oven and allowed to cool to room temperature. Then, a strip of pressure-sensitive tape was applied to the surface of each film. The tape was peeled from the surface, leaving the resin film intact and adhered to the Kapton® substrate. The films then were submersed in boiling water for five minutes, removed, and dried. For each of the resins, the tape application and removal was repeated without damaging the resin film. This demonstrates that the cured films are capable of adhering to thermoplastic substrates.

EXAMPLE 5

Flexibility of N-Octyl-Epoxy-Functional Resin Films

Initial testing of optical films for dynamic flex applications was completed using an automated slide tester. The automated slide tester was used to hold a film bent around a 180° angle against two parallel plates separated at a fixed distance.

The plates then were slid back and forth, such that the film was flexed twice with every cycle progressing from flat, to around a 180° bend, then back to flat. Single-layer films, multi-layer films and patterned stacks all were evaluated using the same procedure.

A cured film of an n-octyl-epoxy-functional resin prepared according to Examples 1-3 above was deposited on a flexible polyimide disk approximately 100 mm in diameter. As a basis for comparison, a film of a methyl-epoxy-function resin was prepared according to Examples 1-3 by replacing the n-octyltrimethoxysilane with an appropriate molar quantity of methyltrimethoxysilane. An optical micrograph of a marked area in the approximate center of each film was recorded before and after slide testing. Then, the disks were taped flat onto a sheet of polyimide carrier film approximately 5 mil (0.127 mm) thick. This ensemble was loaded on the automated slide tester with a 180° bend. The outer radius of curvature was set to 6 mm and the cycle frequency was set to 30/min, equivalent to one bend every second. Samples were bent approximately 10,000 times. The films of n-octyl-epoxy-functional resins showed some evidence of cracking and minor delamination after approximately 10,000 bending cycles. The films of methyl-epoxy-functional resins showed evidence of significant cracking and peeling after only a single bend.

EXAMPLE 6

Flexibility of N-Hexyl-Epoxy-Functional and Isobutyl-Epoxy-Functional Resin Films Films of n-hexyl-functional resins were prepared from a base resin synthesized in a manner analogous to Examples 1-3 by substituting n-hexyltrimethoxysilane in an appropriate molar quantity in the place of n-octyltrimethoxysilane. Films of isobutyl-functional resins were prepared from a base resin synthesized in a manner analogous to Examples 1-3 by substituting isobutyltrimethoxysilane in an appropriate molar quantity in the place of n-octyltrimethoxysilane. For each film, dynamic flex testing was accomplished as indicated in Example 5, including approximately 10,000 bend cycles. Neither the n-hexyl resin films nor the isobutyl resin films showed evidence of cracking or delamination after the dynamic flex testing.

EXAMPLE 7

Bulk Losses of N-Octyl-Epoxy-Functional Resin Monolith

Bulk losses were measured at various wavelengths for monoliths of the epoxy-functional resins. A 75% solution (w/w) of the n-octyl epoxy-functional resin in toluene, prepared according to Examples 1 and 2 above, was placed in an oven for twenty-four hours at 150° C. After this time, the solvent had evaporated, leaving a viscous, clear liquid. The liquid was poured into a 1-cm quartz cuvette while maintaining the temperature at 150° C. Then, the sample was cooled to room temperature and analyzed using a Perkin-Elmer Spectrum GX spectrometer with a quartz beamsplitter. The range of wavelengths measured was 800 nm to 2200 nm. Bulk losses were calculated from the absorption at the wavelengths of interest. The losses were 0.11 dB/cm at 850 nm, 0.09 dB/cm at 1310 nm, and 0.12 dB/cm at 1550 nm.

EXAMPLE 8

Bulk Losses of N-Hexyl-Epoxy-Functional and Isobutyl-Epoxy-Functional Resin Monoliths Monolithic samples of n-hexyl-epoxy-functional resins and isobutyl-epoxy-functional resins were prepared according to Examples 1 and 2 above by replacing n-octyltrimethoxysilane with n-hexyltrimethoxysilane and isobutyltrimethoxysilane respectively, in appropriate molar quantities. A chase (mold) was formed to prepare the resins for IR measurements. To form the chase, a micron-thick DC 7786 fluorosilicone release coating was applied to a glass or aluminum dish via dip coating and subsequently cured for twenty-four hours. The resin samples were poured into the mold and placed in a vacuum oven at 29.5 in of Hg for 6 to 8 hours at 60-70° C. The samples then were removed and inspected for voids and planarity at both surfaces. To remove the samples, the molds were inverted and lightly tapped onto a PSA fluorosilicone release liner. Solvent content was determined by gravimetric analysis to be less than 0.5% by weight. FTNIR measurement was made using a Perkin-Elmer GX spectrophotometer equipped with a NIR source and a NIR DTGS detector with an external NIR optical filter. Both resins exhibited bulk losses of 0.10 dB/cm at 850 nm, 0.10 dB/cm at 1310 nm, and 0.13 dB/cm at 1550 nm.

The invention claimed is:

1. A method of preparing a planar optical waveguide assembly, the method comprising:
   (i) applying a silicone composition to a surface of a substrate to form a first silicone film, wherein the silicone composition comprises:
      (A) an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is independently selected from $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule;
      (B) an organic solvent; and
      (C) a photoinitiator;
   (ii) exposing at least one selected region of the first silicone film to radiation having a wavelength of from 150 nm to 800 nm to produce a partially exposed film having at least one exposed region and at least one non-exposed region;
   (iii) removing the non-exposed region of the partially exposed film with a developing solvent to form a patterned film; and
   (iv) heating the patterned film for an amount of time sufficient to form at least one silicone core having a refractive index from about 1.45 to about 1.60 at 23° C. for light having a wavelength of 589 nm, such that the refractive index of the silicone core is greater than the refractive index of the substrate.

2. The method of claim 1, wherein $R^3$ is selected from the group consisting of 2-methylpropyl, n-hexyl, and n-octyl.

3. A planar optical waveguide assembly prepared according to the method of claim 1.

4. The method of claim 1, further comprising, after (ii) and before (iii), heating the partially exposed film for an amount of time, such that after said heating the exposed region is substantially insoluble in the developing solvent of (iii) and the non-exposed region is soluble in the developing solvent of (iii).

5. A planar optical waveguide assembly prepared according to the method of claim 3.

6. The method of claim 1, further comprising:
(v) covering the substrate and the silicone core with a curable polymer composition to form a polymer film; and
(vi) curing the polymer film to form a clad layer, wherein the clad layer has a refractive index less than the refractive index of the silicone core.

7. The method of claim 5, wherein the curable polymer composition is the silicone composition from (i).

8. A planar optical waveguide assembly prepared according to the method of claim 6.

9. The method of claim 6, further comprising, after (ii) and before (iii), heating the partially exposed film for an amount of time, such that after said heating the exposed region is substantially insoluble in the developing solvent of (iii) and the non-exposed region is soluble in the developing solvent of (iii).

10. A planar optical waveguide assembly prepared according to the method of claim 8.

11. A planar optical waveguide assembly prepared according to the method of claim 10.

12. The method of claim 10, further comprising, after (iv) and before (v), heating the partially exposed film for an amount of time, such that after said heating the exposed region is substantially insoluble in the developing solvent of (v) and the non-exposed region is soluble in the developing solvent of (v).

13. The method of claim 10, further comprising:
(vii) covering the lower clad layer and the polymer core with a third curable polymer composition to form a third polymer film; and
(viii) curing the third polymer film to form an upper clad layer, wherein the upper clad layer has a refractive index less than the refractive index of the polymer core,
wherein the first and third curable polymer compositions only, the second curable polymer composition only, or all three curable polymer compositions comprise the silicone composition.

14. A planar optical waveguide assembly prepared according to the method of claim 11.

15. The method of claim 11, further comprising, after (iv) and before (v), heating the partially exposed film for an amount of time, such that after said heating the exposed region is substantially insoluble in the developing solvent of (v) and the non-exposed region is soluble in the developing solvent of (v).

16. The planar optical waveguide assembly of claim 13, wherein $R^3$ is selected from the group consisting of 2-methylpropyl, n-hexyl, and n-octyl.

17. A method of preparing a planar optical waveguide assembly, the method comprising:
(i) applying a first curable polymer composition to a surface of a substrate to form a first polymer film;
(ii) curing the first polymer film to form a lower clad layer;
(iii) applying a second curable polymer composition to the lower clad layer to form a second polymer film;
(iv) exposing at least one selected region of the second polymer film to radiation having a wavelength of from 150 to 800 nm to produce a partially exposed film having at least one exposed region and at least one non-exposed region;
(v) removing the non-exposed region of the partially exposed film with a developing solvent to form a patterned film; and
(vi) heating the patterned film for an amount of time sufficient to form at least one polymer core having a refractive index of from about 1.45 to about 1.60 at 23° C. for light having a wavelength of 589 nm, such that the refractive index of the polymer core is greater than the refractive index of the lower clad layer,
wherein the first curable polymer composition only, the second curable polymer composition only, or both curable polymer compositions comprise a silicone composition comprising:
(A) an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is independently selected from $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule;
(B) an organic solvent; and
(C) a photoinitiator.

18. A planar optical waveguide assembly prepared according to the method of claim 17.

19. A planar optical waveguide assembly prepared according to the method of claim 18.

20. A planar optical waveguide assembly comprising:
a substrate having a first refractive index at 23° C. for light having a wavelength of 589 nm;
at least one polymer core disposed over a portion of the substrate and comprising a second cured polymer composition, the at least one polymer core having a second refractive index of from about 1.45 to about 1.60 at 23° C. for light having a wavelength of 589 nm, such that the second refractive index is greater than the first refractive index; and
a cladding comprising one or both of
a lower clad layer disposed on the substrate and below the at least one polymer core, the lower clad layer comprising a first cured polymer composition, the lower clad layer having a third refractive index at 23° C. for light having a wavelength of 589 nm, the third refractive index being less than the second refractive index, and
an upper clad layer disposed on the polymer core and, if present, the lower clad layer, the upper clad layer comprising a third cured polymer composition, the upper clad layer having a fourth refractive index at 23° C. for light having a wavelength of 589 nm, the fourth refractive index being less than the second refractive index,
wherein the second cured polymer composition only, the first and third cured polymer compositions only, or all three cured polymer compositions comprise a polymer produced from curing a silicone composition comprising an organopolysiloxane resin having the formula $(R^1R^2_2SiO_{1/2})_v(R^2_2SiO_{2/2})_w(R^2SiO_{3/2})_x(R^3SiO_{3/2})_y(SiO_{4/2})_z$, wherein $R^1$ is $C_1$ to $C_{10}$ hydrocarbyl, $R^2$ is independently selected from $R^1$ or an epoxy-substituted organic group, $R^3$ is $C_4$ to $C_8$ alkyl, v is from 0 to 0.3, w is from 0 to 0.5, x is from 0 to 0.9, y is from 0.1 to 0.8, z is from 0 to 0.5, and v+w+x+y+z=1, provided the organopolysiloxane resin has an average of at least two silicon-bonded epoxy-substituted organic groups per molecule.

* * * * *